G. M. HORNECKER.
MOTOR CYCLE.
APPLICATION FILED MAR. 11, 1908.
926,745.
Patented July 6, 1909.
2 SHEETS—SHEET 1.
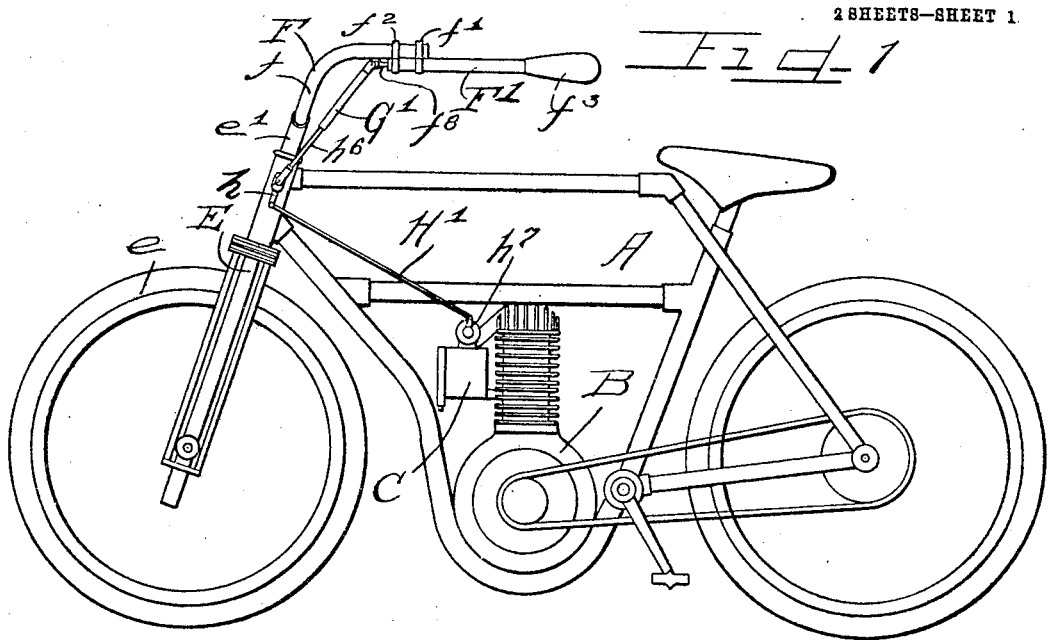
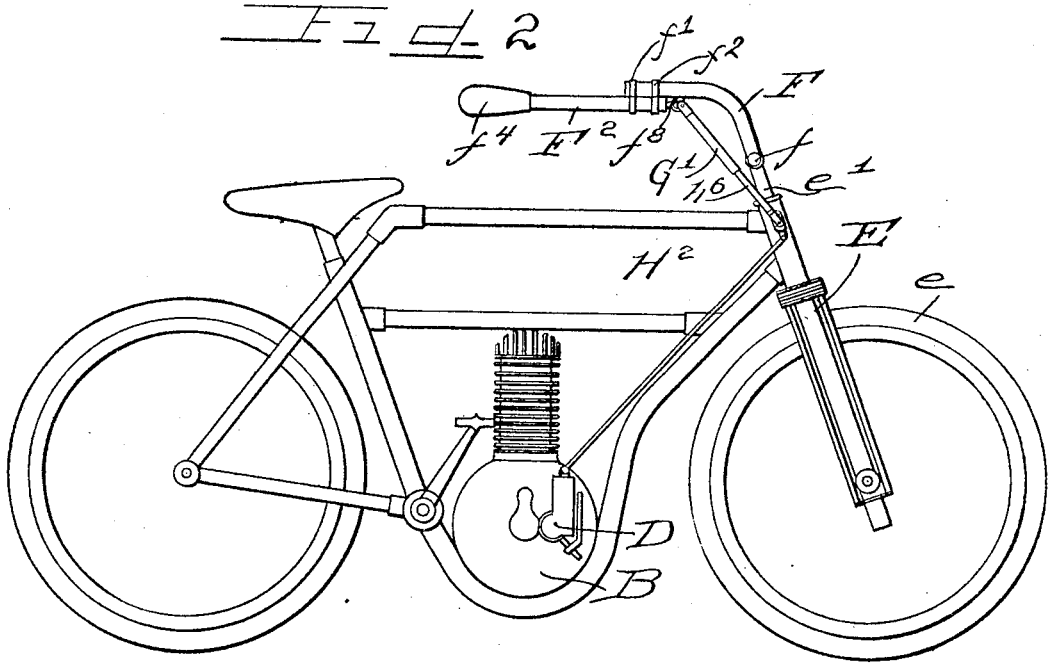

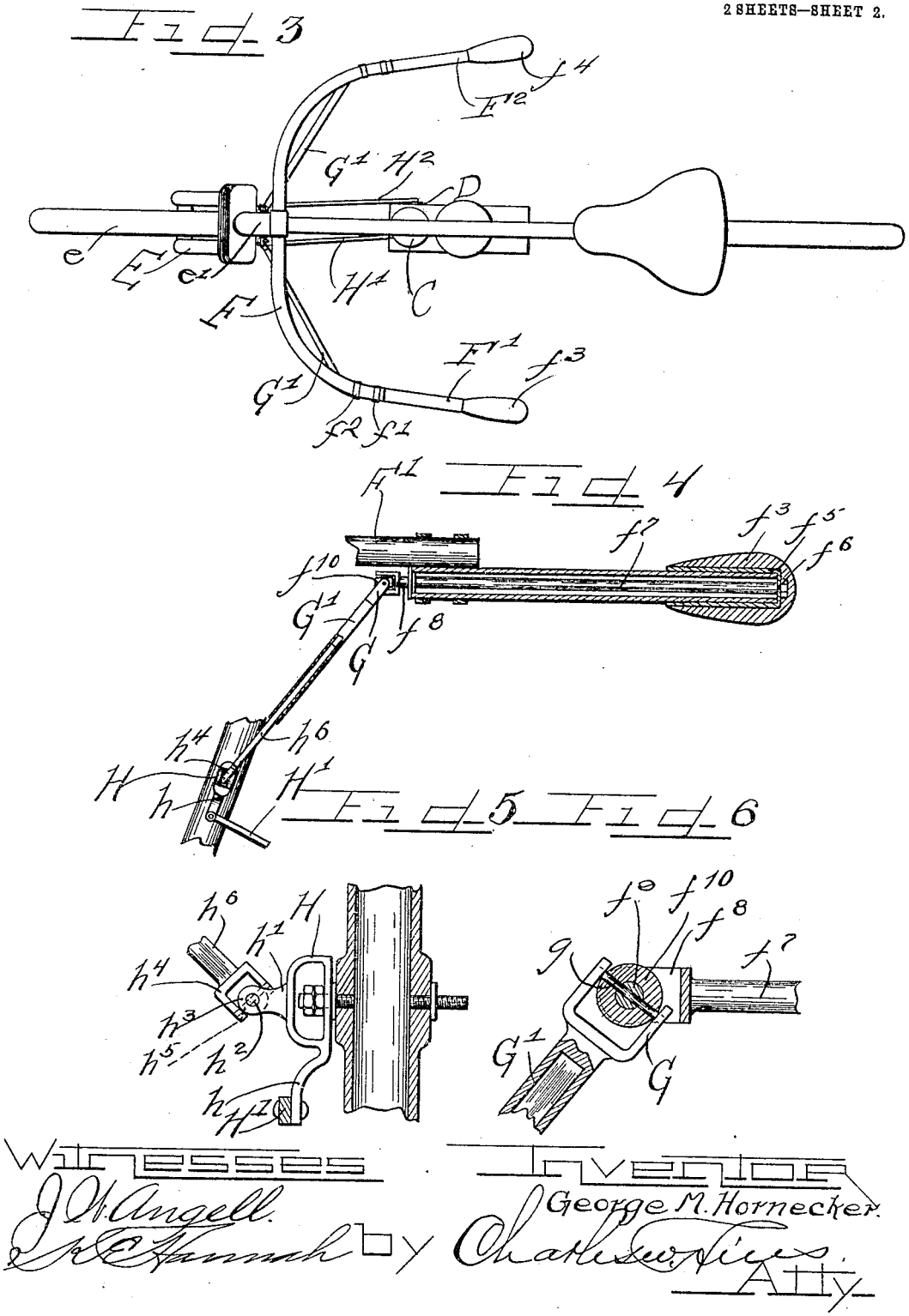

UNITED STATES PATENT OFFICE.

GEORGE M. HORNECKER, OF WHITING, INDIANA.

MOTOR-CYCLE.

No. 926,745.  Specification of Letters Patent.  Patented July 6, 1909.

Application filed March 11, 1908. Serial No. 420,363.

*To all whom it may concern:*

Be it known that I, GEORGE M. HORNECKER, a citizen of the United States, and a resident of the city of Whiting, in the county of Lake and State of Indiana, have invented certain new and useful Improvements in Motor-Cycles; and I do hereby declare that the following is a full, clear, and exact description of the same, reference being had to the accompanying drawings, and to the letters of reference marked thereon, which form a part of this specification.

Heretofore owing to the necessity for adjusting the spark and the throttle of motor cycle engines to vary speed it has been necessary for the operator to release his hands from the handle bars and usually to reach down for one or both of these operations, necessitating a change in the position which in itself may be inconvenient, especially for one not expert in the use of such machines, and in any event, should the road be rough or traffic congested at least momentarily interfering with the ability of the rider to hold his machine in perfect control, this becomes positively dangerous in the event of muddy or rough roads where all the skill of the operator and much strength are required at times in guiding the machine. Furthermore, it is not unusual for the adjusting means heretofore used to be thrown out of adjustment by vibration of the machine owing to inequalities in the road, thus necessitating almost constant attention by the operator, who, with constructions heretofore used, has found it impossible to hold the adjustment at all times at the desired point.

With this in view, the object of the invention is to afford a construction whereby though the utmost freedom of movement is permitted in steering the machine, both the throttle and the spark are controlled from the handle grips, thus enabling the operator to have these important adjustments always in perfect control and furthermore enabling the operator to instantly adjust the throttle and spark or either, to suit the requirements of the road and without necessitating the operator even momentarily releasing the handle grips, of course, thereby at all times permitting the operator to hold and operate the handle bars as occasion may require.

It is also an object of the invention to afford an exceedingly simple construction applicable to motor cycles and like devices of any kind or make and adapted to be quickly applied and operating at all times positively not only to enable the desired adjustment to be made but as well to hold the adjusted parts in adjusted position.

The invention consists in the matters hereinafter described and more fully pointed out and defined in the appended claims.

In the drawings: Figure 1 is a side elevation of a motor cycle with a device embodying my invention, and illustrating the adjustment of the throttle. Fig. 2 is a similar view of the opposite side of the motor cycle showing the device applied to adjust the spark. Fig. 3 is a top plan view. Figs. 4, 5, and 6 are enlarged fragmentary details illustrating the construction and operation of the device.

In said drawings: As shown, the motor cycle indicated as a whole by A, may, of course, be of any desired construction and is provided with an internal combustion engine B, having a carbureter C and a timer or spark adjuster D, which, of course, may also be of any desired type or construction. The frame of the motor cycle may be constructed in all respects as usual and is provided with the usual fork E, for the front wheel $e$, and rotatably engaged in the sleeve $e'$, is the steering post rigidly connected with the fork, and in which is adapted to be rigidly secured the stem or post $f$ of the handle bars F, which are constructed as usual with the exception that at the rear extremity of each handle bar downwardly extended brackets $f'$—$f^2$ are secured in which, on each arm of the handle bar and substantially in alinement with the handle bar proper, is an extension $F'$—$F^2$, which may be of any desired length for convenience of the rider or operator and may be either straight or curved to best adapt the same for use. Said extensions are tubular as shown in Fig. 4, and rotatably engaged on each is a hand grip $f^3$—$f^4$. As shown, said rotatable hand grip comprises a sleeve $f^5$, fitted to receive and rotate on the handle bar extensions $F'$ or $F^2$ and is provided with an integral head $f^6$ at the inner end to which is rigidly engaged in any suitable manner a shaft or rod $f^7$, which may be tubular if desired, for lightness, or may be flexible if the extension be curved and which extends forwardly through the end of the extension, as shown in Figs. 1, 2 and 4, and is provided at its outer end with a yoke $f^8$, in which is journaled to rotate a pin $f^9$, and which, as shown, passes through the ball or disk $f^{10}$, as preferred, which fits closely between the arms of the fork. Extending through said pin at right angles with the axis thereof is a pin $g$, the ends of which extend through the arms of the yoke G, corresponding with the arms of the yoke $f^8$, before described, and which fit to the sides of the disk or ball $f^{10}$ before mentioned. Said yoke G is integrally connected to a tubular shaft G', which preferably is angular in cross section for convenience for which a square tube is usually employed.

Pivotally bolted at any convenient point on the frame preferably on the steering head, is a clip H, provided with a downwardly extending arm or lever $h$, and provided approximately in alinement with the pivot axis with outwardly extending arms $h'$, through which passes a pin $h^2$, on which may be provided a disk or ball $h^3$, as in the universal joint before described, and to which is pivotally engaged the yoke $h^4$, by means of a pin $h^5$ passing through the pin $h^2$ before described centrally and at right angles with its axis, thus affording a universal joint.

Integrally connected with the yoke $h^4$ is an angular rod or shaft $h^6$, slidably engaged in the tubular shaft G', to afford a slip joint. Extending rearwardly from the arm or lever $h$ on the clip H is a rod H', which extends to the throttle lever $h^7$, as shown in Fig. 1. The construction is identical for adjusting the spark and from the end of the lever $h^6$ on that side of the steering head a rod H², as shown in Fig. 2, extends to the spark adjuster or timer D to adjust the same.

The operation is as follows: The rider when holding the grips $f^3$—$f^4$ has obviously both the spark and throttle under constant and instant control. Should he desire to adjust either, rotation of the grip produces corresponding rotation of the shaft $f^7$, and the adjustable shaft connecting the universal joints before described with the effect that rotation thereof shifts the clip on the steering head inasmuch as the clip can rotate, thereby moving the lever or arm $h$ forwardly or rearwardly, depending upon the direction of rotation of the grip and produces a corresponding adjustment of the throttle or of the spark adjuster, either to increase or decrease the supply of mixture or advance or retard the spark as occasion may require, inasmuch as both the spark and throttle are under constant control, the adjustment may be effected simultaneously or independently and obviously, inasmuch as the adjustment can only be effected while holding the hand grips, control of the motor cycle so far as steering is concerned is never for a moment lost. Furthermore, owing to the exceedingly simple and inexpensive construction described the device may be applied readily to any vehicle of the class described or even to automobiles in which steering is effected by means of a hand operated lever.

While I have described my invention as applicable to a motor cycle, and having described but one of several possible arrangements all embodying my invention, equally within the scope thereof, I do not purpose limiting this application for patent otherwise than necessitated by the prior art, as obviously many details of construction may be varied dependent upon the particular type of motor vehicle to which the device may be applied or to the preference of the individual user.

Where in the specification I have used the expression "motor cycle" I desire the term to be considered generically and as applying to any motor driven vehicle.

I claim as my invention:

1. In a motor cycle the combination with the handle bars, of extension handles, one rigidly secured to each handle bar, rotatable grips, one on the outer end of each extension handle, rigid shafts, one connected with each grip, extending through and projecting beyond the end of the respective extension handle opposite the grips, independently operating mechanisms connected with the respective shafts adapted for independent actuation for adjusting the throttle and sparking mechanism singly or simultaneously.

2. In a motor cycle the combination with the handle bars, of an extension handle secured to each of said handle bars, rotatable hand grips thereon, shafts, each actuated by rotation of the respective hand grip, and each operatively connected, one to adjust the throttle, the other to adjust the spark adjuster independently of the throttle.

3. In a motor cycle the combination with the handle bars of extensions thereon offset therefrom, means for rigidly securing the extensions to the handle bars, a rotatable hand grip on each extension, a shaft actuated by rotation of each hand grip and operatively connected with the throttle and the spark adjusting means respectively and universal joints on each shaft.

In testimony whereof I have hereunto subscribed my name in the presence of two subscribing witnesses.

GEORGE M. HORNECKER.

Witnesses:
K. E. HANNAH,
J. W. ANGELL.